United States Patent [19]

Wolf et al.

[11] 4,254,922
[45] Mar. 10, 1981

[54] TAPE CASSETTE

[75] Inventors: Theo Wolf, Rossdorf; Dieter Gause, Weiterstadt; Hans-D. Schneider, Gross Gerau; Peter Gunschmann, Darmstadt, all of Fed. Rep. of Germany

[73] Assignee: Robert Bosch GmbH, Stuttgart, Fed. Rep. of Germany

[21] Appl. No.: 10,816

[22] Filed: Feb. 9, 1979

[30] Foreign Application Priority Data

Feb. 21, 1978 [DE] Fed. Rep. of Germany ....... 2807271
Sep. 27, 1978 [DE] Fed. Rep. of Germany ....... 2841993

[51] Int. Cl.³ .................. G03B 1/04; G11B 15/32
[52] U.S. Cl. .................................. 242/194; 242/197; 360/132
[58] Field of Search ............... 242/193, 194, 199, 198, 242/200, 54.1, 197; 360/96.1, 96.6, 132; 352/156

[56] References Cited

U.S. PATENT DOCUMENTS

| 1,548,960 | 8/1925 | Stuber et al. | 242/193 |
| 2,866,010 | 12/1958 | Dale | 242/193 X |
| 3,294,334 | 12/1966 | Boag | 242/194 |
| 3,672,603 | 6/1972 | Swain | 242/194 |
| 3,829,203 | 8/1974 | Novak | 242/194 |
| 3,936,010 | 2/1976 | Lu | 242/194 |

Primary Examiner—Leonard D. Christian
Attorney, Agent, or Firm—Frishauf, Holtz, Goodman & Woodward

[57] ABSTRACT

In order to provide protection to magnetic tape during storage and use, a tape holding cassette according to the invention has a closable housing within which there is disposed a movable entity consisting of a separating wall that can glide in suitable grooves within the housing. Mounted on opposite surfaces of the separating wall are tape reel holding and rotating hubs and further mounted on the separating wall are tape guiding mechanisms that guide the tape from one reel across the edge of the separating wall to the second tape reel, thereby defining a path in which the tape travels obliquely with respect to the plane of the housing. The tape reel hubs have gears that can engage corresponding gears of the tape recorder and they include internal locking mechanisms that automatically prevent relative rotation of the tape reels with respect to one another and with respect to the cassette during transport. The tape lock mechanism is disengaged in use by elements which are integral with the tape recorder apparatus.

42 Claims, 17 Drawing Figures

TAPE CASSETTE

FIELD OF THE INVENTION

The invention relates to a cassette which holds magnetic tape that serves as a storage medium for electrical data. More particularly, the invention relates to a cassette having two coaxial tape reels which may be displaced with respect to the cassette for insertion in an associated tape recorder or playback mechanism.

BACKGROUND AND PRIOR ART

In a magnetic tape cassette described in the German Auslegeschrift 2 131 731, two cassette reels float within the interior of the cassette housing and are aligned both axially and radially within the cassette only after insertion within the magnetic tape recorder. In this design, the inside diameter of the tape reel hubs is different, which is an advantage from the point of view of the uniformity of the components within the system. Furthermore, the known cassette makes no provision for removing the reels individually so as to be used on a magnetic tape recorder of the reel-to-reel type. Further known in the art is a tape cassette with a single reel and an endless tape loop in which the tape passes an open end of the cassette over pivotable arms.

THE INVENTION

It is an object of the present invention to provide a tape cassette in which both tape reels have the same diameter. It is a further object of the invention to provide a tape cassette in which both tape reels can be easily removed from the cassette for use on a reel-to-reel tape recorder or playback machine. Briefly, these objects are attained by the invention by providing that the two tape reels are mounted on opposite sides of a separating wall which divides the cassette housing into two chambers. The separating wall is equipped with various tape guide devices which alter the manner of tape control when the tape is removed from the cassette. In this way unilateral stresses and tape slack as well as edge pressures are effectively prevented. A closure mechanism is provided to hold a cover closed, the cover variably blocking an opening into the cassette housing. The closure mechanism preferably has a pivot axis which also is the pivot axis for a tape guide element.

In accordance with a feature of the invention, a braking mechanism engages the tape reel hubs when the cassette is outside of the tape recorder so as to arrest the tape reels and prevent tape slack.

It is an advantageous feature of the invention that, when the cassette is closed, it is of a robust shape and construction and its unintentional opening is virtually impossible. However, when open, the cover of the cassette does not extend beyond the cross-sectional profile of the cassette housing.

Two exemplary embodiments of the invention will now be described in detail in conjunction with the drawing.

DESCRIPTION OF THE PREFERRED EMBODIMENTS

Figure 1:
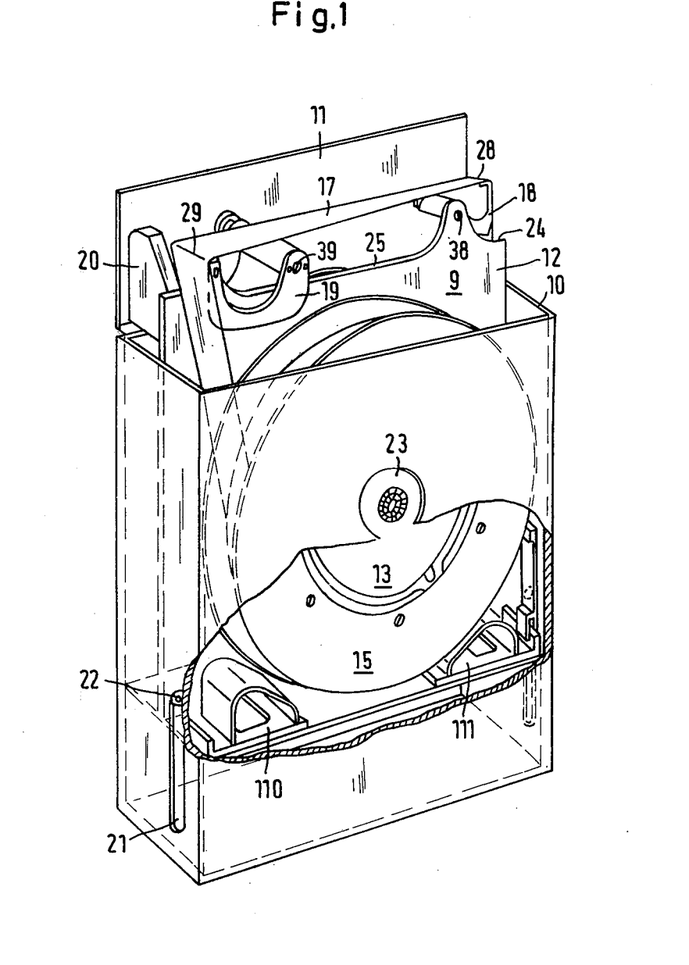
FIG. 1 is a perspective view of a first embodiment of the tape cassette according to the invention with the cover illustrated in the open position and the tape reels on the separating wall partially removed from the cassette.

FIG. 1 illustrates a first exemplary embodiment of a tape cassette according to the invention with a cassette housing 10 substantially shaped like a rectangular parallelepiped with a hinged cover 11 at the narrow side. Disposed substantially at equal distance from the front and back surfaces of the cassette 10 lies a separating wall 12 on opposite sides of which are mounted tape reel hubs 13, 14. Each of the tape reel hubs carries a tape reel, for example, as illustrated, the hub or core 13 holds the reel 15 in FIG. 1. A tape 17 provided with a magnetizable layer extends from one reel to the other across the narrow edge of the separating wall 12 and is guided in its path by guide elements 18 and 19. The separating wall 12 exhibits a lateral protrusion 20 (FIG. 2) which causes the cover 11 to be opened against the force of a spring, not shown, when the separating wall is removed from the cassette housing, thereby preventing contact between the cover and the tape.

The relative movement of the separating wall 12 which carries the tape reels and tape guide elements with respect to the housing 10 is limited by the cooperation of a groove 21 in the side wall of the housing and a pin 22 moving therein. One flat side of the cassette housing 10 has an opening 23 which permits access to the tape drive cores or hubs by suitable drive shafts associated with the tape recording and playback apparatus on which the cassette is mounted.

A tape cassette in which magnetic tape travels between two coaxial tape reels is preferably used in applications where the tape passes helically around a transducer device and in which the vertical distance traversed by the tape corresponds roughly to its own width. It is thus advantageous if the magnetic tape within the cassette is so guided as to define a free path which extends generally in the sense of this vertical difference. For example, in the cassette according to the invention, the magnetic tape travels between the tape guide elements 18 and 19 at a certain angle with respect to the cassette surface. However, this angle is not necessarily identical to the angle which the tape must define in operation and when the tape is in contact with the transducer heads. The edges 28 and 29 of the tape guide elements 18 and 19, respectively, define angles with respect to the housing permitting the tape between the two reels to be guided with uniform tension. Because the operational angles at which the tape is held do not correspond to those in the cassette, the tape guides 18 and 19 are mounted pivotably on shafts 38 and 39 in such a way that the edges 28 and 29 can retreat from the tape toward the reels 15 and 16. Furthermore, the tape cassette separating wall 12 has recesses 24 and 25 which permit the passage therethrough of tape guide elements belonging to the tape recording and playback apparatus. To permit this passage, the tape guide elements 18 and 19 are hook-shaped so as not to impede the passage of the tape guide elements of the recorder.

Figure 2:
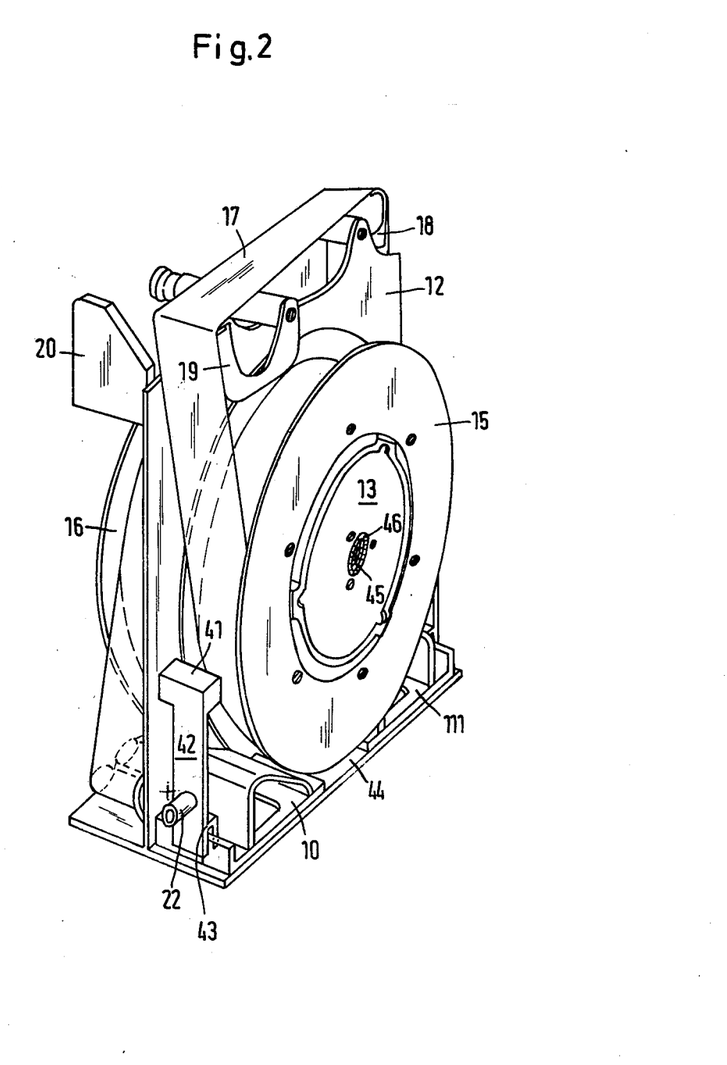
FIG. 2 is a perspective illustration of the internal parts of the cassette, including the separating wall and the tape reel hubs.

FIG. 2 is an illustration of the internal parts of the cassette of FIG. 1. This illustration shows the attachment of the tape reels 15 and 16 on their respective hubs on the separating wall 12. The tape 17 is seen to extend from the reel 15 to the reel 16 and the tape guide elements 18 and 19 define between them a tape path which is inclined with respect to the plane of the reels. A support block 41 attached to the separating wall 12 holds an elastic lever 42 whose free end is bifurcated at 43 but which may be of one piece. Near the unattached end of the lever 42, there is mounted the pin 22 which glides within the slot 21 of the housing 10. The center of the reel hub 13 exhibits two concentric frontal end-face gears 45, 46 which are intended to cooperate with a mating face driver-type drive shaft of the magnetic tape recorder or playback mechanism.

Figure 3:
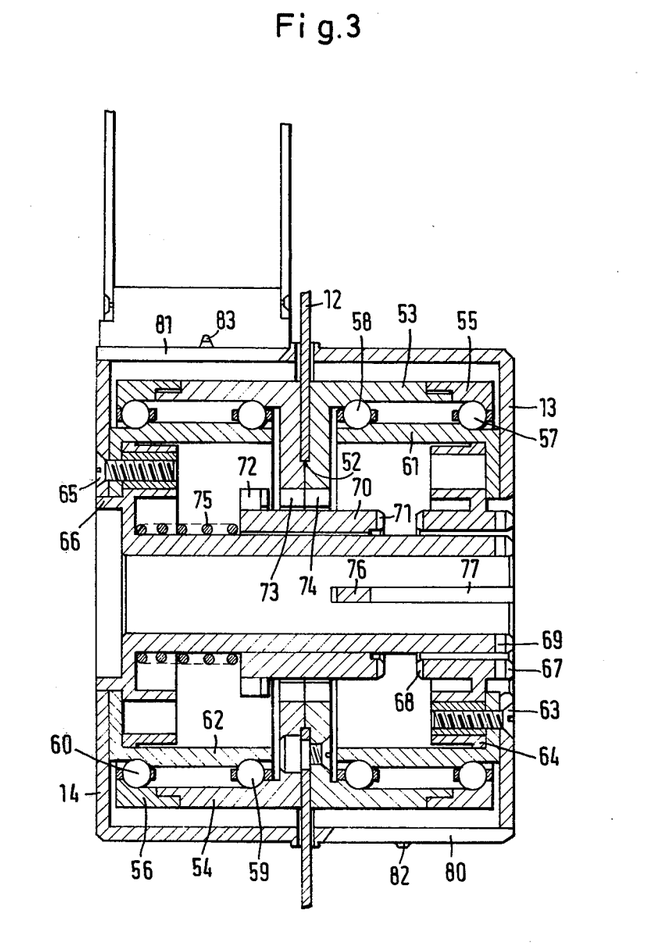
FIG. 3 is a sectional illustration of the disposition of the tape reel hubs on the separating wall.

FIG. 3 illustrates the manner in which the two tape hubs 13, 14 are attached to the separating wall 12. Mounted on opposite sides of the wall 12 concentrically with an opening 52 are two bushings 53, 54 which cooperate respectively with covers 55, 56 to define the outer races of the anti-friction bearings 57, 58, 59, 60. The inner races of the bearings 57, 58 are formed by a ring 61 which is attached to the reel hub 13 by a plurality of recessed screws such as 63. Also held in place by these screws 63 is a drive ring 64 whose two end faces are provided with plane end face gears 67 and 68, respectively. A hub tube 66 passes through the center of the drive ring 64 and is provided with plane end face gear teeth 69 coaxial with the gear 67 but of somewhat smaller diameter. Sliding on the hub tube 66 is a locking sleeve 70, one end face of which has a set of plane end face gears 71 which can cooperate with the gears 68 of the drive ring 64. The other end of the locking sleeve 70 has external gears 72 which can cooperate with two internal gears 73, 74 disposed, respectively, in the internal bores of the bushings 53 and 54. A compression spring 75 urges the locking sleeve 70 to cause the engagement of the gear combinations 68,71 and 72, 73, 74, respectively. A lateral key 76 glides in a slot 77 of the hub tube 66 so as to share in the rotation thereof.

Figure 4:
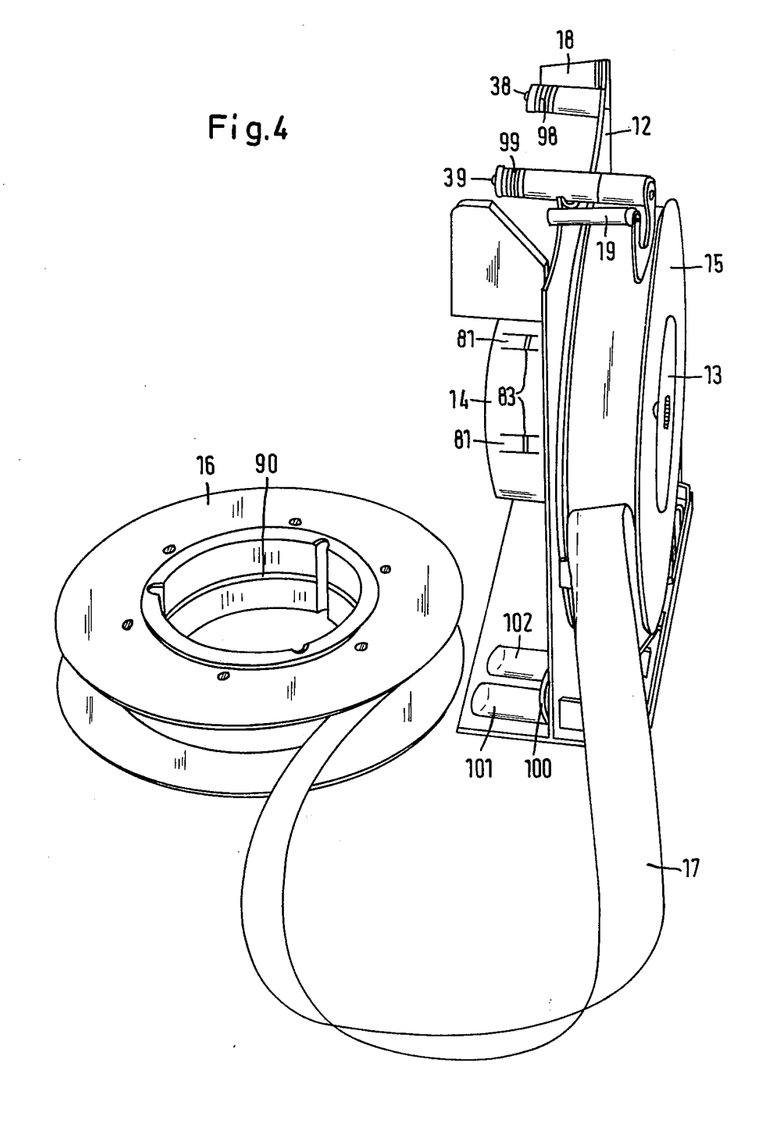
FIG. 4 is a perspective illustration similar to that of FIG. 2 with one tape reel removed from its hub for clarity.

The cylindrical periphery of the two tape hubs 13, 14 exhibits a plurality of alternating wide and narrow segments, the wide segments being substantially smooth so as to fit into the central hole of the reels with clearance. The narrower segments 80, 81 exhibit protrusions 82, 83 substantially in the center thereof. The protrusions 82, 83 are intended to engage a groove 90 extending annularly around the inside diameter of the reel 16, as best seen in FIG. 4. The engagement is preferably elastic.

Operation of the bearings and the associated mechanism: When the tape cassette is located outside of the playback apparatus, the locking sleeve 70 (FIG. 3) is urged by the compression spring 75 into a position in which its frontal gears 71 engage the frontal gears 68 of the drive ring 64. At the same time, the external gears engage the internal gears 73, 74 of the bushings 53, 54. Inasmuch as the drive ring 64 is rigidly attached to the reel hub 13 and the locking sleeve 70 shares the rotation of the hub tube 66 because of the presence of the key 76, and because the hub tube 66 is rigidly attached by the screws 65 to the tape reel hub 14, any relative rotation between the two reel hubs 13, 14 as well as any rotation between them and the separating wall 12 are positively prevented. Accordingly, when the tape cassette is being transported and stored, the tape reel hubs 13 and 14 as well as the reels mounted thereon are protected against unintentional motion due, for example, to shocks, etc.

The force of the spring 75 is so chosen that it is possible to cause relative sliding movement as between the two frontal gears 68, 71 so as to prevent excessive tape tension if the cassette is improperly handled. During such relative motion, the locking sleeve 70 is lifted against the force of the spring 75 so as to permit its rotation with respect to the drive ring 64. This motion permits the rotation of the reel hub 13 and its tape reel far enough to permit transport of tape between the guide elements 18 and 19 so as to prevent excessive longitudinal stresses in the tape.

Figure 6:
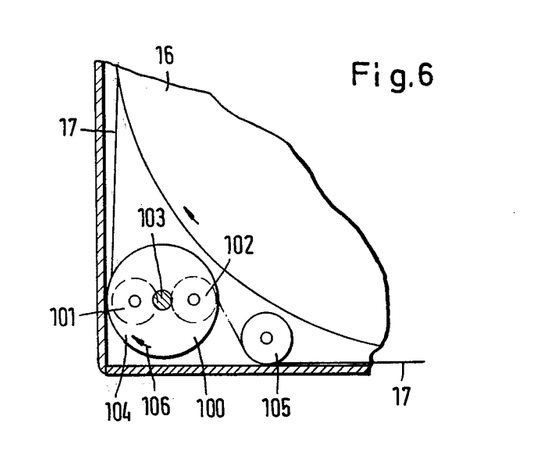
FIG. 6 is a partially schematic view of a compensating mechanism to prevent tape slack.

FIG. 4 is a second perspective view of the apparatus of FIG. 2 illustrating the cassette interior with the reel 16 removed from its hub 14. The reel hub 14 shows two elastic elements 81 with the protrusions or cams 83 which engage the annular groove 90 of the reel 16 when the reel is mounted on the hub and hold it with a predetermined amount of elastic stress. Both reels 15, 16 may easily be removed from their respective hubs and may be mounted on a reel-to-reel recording machine for independent rotation and playback. The tape guide elements 18, 19 are pretensed on their shafts 38, 39 by torsion springs 98, 99 so as to keep the tape taut with a predetermined amount of force. When the reels are removed from their hubs, the tape guide elements 18, 19 abut against stop members, not shown, which prevent excessive rotation thereof. As seen in FIGS. 4 and 6, the magnetic tape travels around two rollers 101, 102 belonging to an equalizer 100. This mechanism is described in greater detail below.

Figure 5:
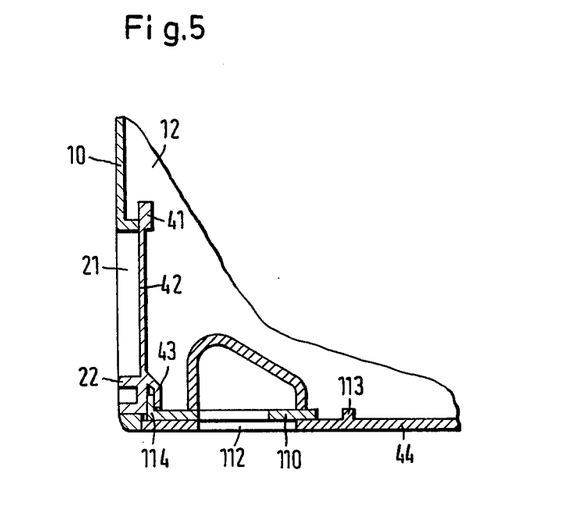
FIG. 5 illustrates in detail a locking mechanism for holding the interior parts of the cassette in the housing.

The separating wall 12 as well as the reel-holding hubs 13, 14 and the reels 15, 16 and including the tape guide elements 18, 19, may be removed as a single unit by sliding the separating wall 12 out of the cassette housing 10 in either direction, i.e., through the opening which is covered by the cover 11 or through the opposite end 44. This movement is made possible by so dimensioning the end wall 44 that it can slide within the interior dimensions of the housing 10 in either direction. Normally the two pins 22 mounted on the elastic arm 42 on either side of the cassette prevent the motion of the internal parts of the cassette beyond the extent of the slot 21. However, the cassette face 44 includes two slides 110, 111 which may be seen in FIGS. 1, 2 and 5. The slide 110 is made accessible by an opening 112 in the side 44 and can be pushed to the side against the elastic force of the arm 42 up to a stop 113. A hook-shaped portion 114 of the slide 110 engages the bifurcated end 43 of the lever 42 and thereby pulls the pin 22 from the region of the slot 21. Inasmuch as the elastic arm 42 is mounted on the separating wall 12, it is then possible to remove the wall 12 and all of the elements attached thereto from the cassette housing 10.

The tape equalizing device 100 (see FIG. 6) includes a disc 104 rotating on a shaft 103 and carrying two rotating equalizer rollers 101, 102 at substantially equal radial distances from the shaft 103. The tape 17 which comes from the reel 16 is looped in an S-shape around the two equalizer rollers 101 and 102 and then passes over a guide roller 105 whereafter it is engaged by other tape guide elements in the cassette to follow a predetermined path. By means of a torsion spring, not shown, the disc 104 may be rotated in a direction opposite to the arrow 106, thereby applying a tension of predeterminable amount to the tape. However, the pretension of the device 100 may also be provided by elements attached to the tape recording and playback mechanism.

The action of the equalizer device 100 is especially important when the cassette is in its operational position within the recording and playback mechanism and the tape 17 extends in that apparatus in a predetermined way. In that case, the internal locking mechanism of the cassette, i.e., the locking sleeve 70, is made ineffective and, in order to conserve battery power in portable recorders, the drive motors are deenergized during transport. Thus pendulum motions of the tape recorder during transport might cause unintentional rotation of the tape reels and could cause the tape to become slack within the cassette. This is prevented by the equalizer 100 which is affected by external torques in the same manner as are the tape reels 15, 16 and which is supported by the torsional spring, not shown, or the tensing mechanism in the tape recorder to rotate, for example counterclockwise, and take up excess tape or to give up tape during clockwise rotations.

Figure 7:
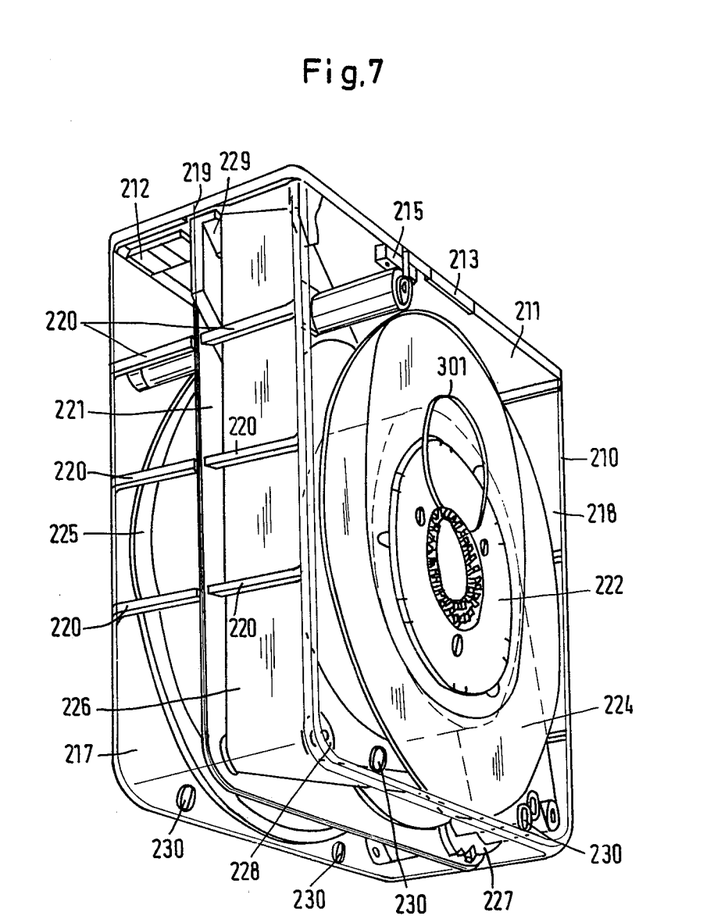
FIG. 7 is a perspective illustration of a second exemplary embodiment of a tape cassette according to the invention.
Figure 8:
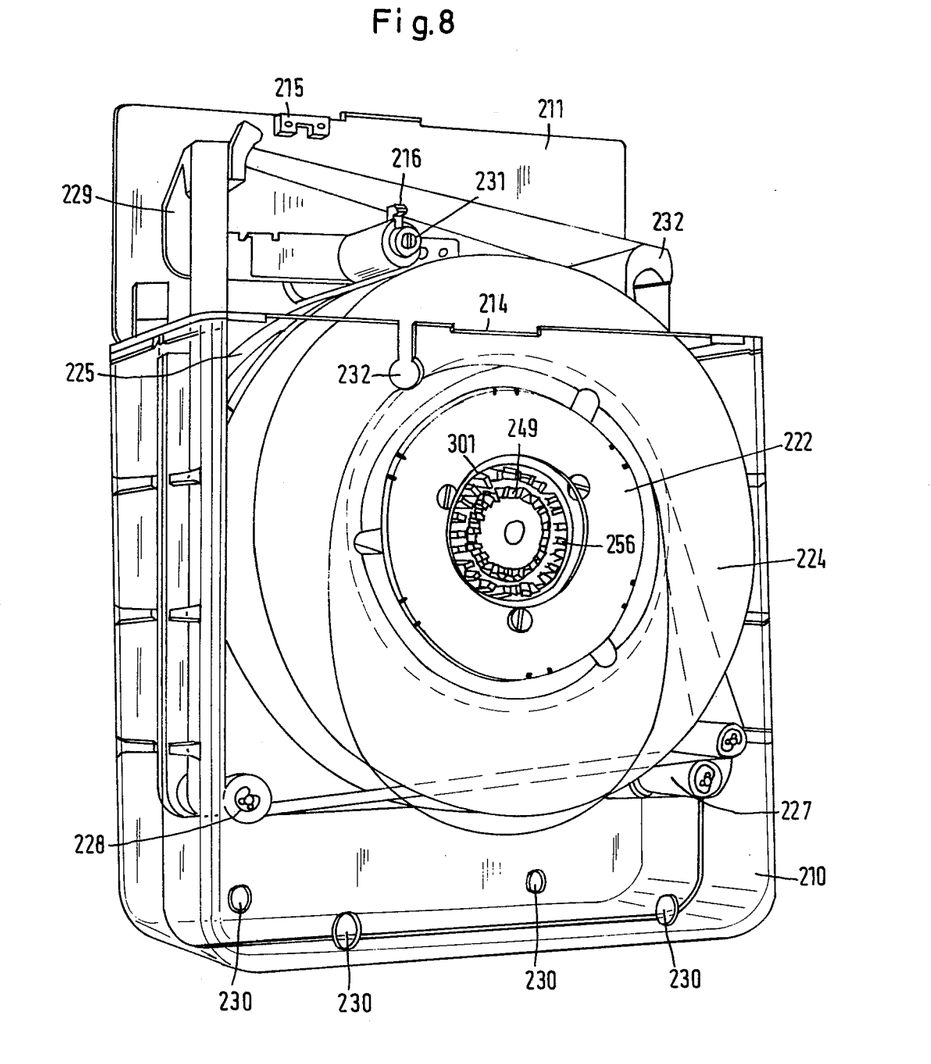
FIG. 8 is a an illustration similar to that of FIG. 7 with the cassette cover open and the internal parts mounted on the separating wall partially removed from the housing.

A second exemplary embodiment of the invention is illustrated in FIG. 7 in a perspective view showing a housing 210 with an opening closable by a cover 211. The cover 211 is attached to the housing by a hinge 212 whose construction and detailed functioning will be described in connection with the illustrations of FIGS. 11 and 12. A protrusion 213 on the cover 211 engages a corresponding recess 214 in the housing wall when the cover is closed. (FIG. 8). A locking piece 215 mounted on the cover 211 cooperates with a latch 216. The housing 210 in the embodiment according to FIGS. 7 and 8 is composed of two shells 217, 218, which are joined along a peripheral central seam 219. Each of the shells 217, 218 has stiffening ribs at periodic intervals along the narrow side so as to increase the overall rigidity and stability of the housing 210. In the vicinity of the central seam 219, the stiffening ribs 220 are recessed so as to permit the passage of a separating wall 221 substantially along the central plane of the housing 210. The stiffening ribs 220 guide and hold the separating wall 221 in its terminal position.

In a manner to be further described in detail below in connection with FIG. 10, tape reel hubs 222, 223 are rotatably mounted on opposite sides of the separating wall 221 and are equipped to support and rotate respective tape reels 224, 225. A tape 226 with a magnetizable layer extends from the reel 224 across the narrow side of the separating wall 221 to the other tape reel 225. A tape equalizing device 227 is located in the tape path so as to prevent tape slack when the cassette is mounted in its recording and playback mechanism when the latter is inoperative. The construction and functioning of the equalizer 227 corresponds entirely to that of the equalizer 100 described above.

Following the equalizer 227, the tape encounters a guide and deviating roller 228 whose shaft is mounted near the edge of the separating wall 221. The path of the tape between the roller 228 and a further tape guide element 229 located near the cover 211 is a twisting region in which the plane of the tape is rotated so as to permit the transition of the tape 226 from one side of the separating wall 221 to the opposite side without the imposition of unilateral strain or edge stresses.

Recesses or holes 230 in the large sides 270 of the shells 217, 218 serve to facilitate admission or handling of the cassette in the cassette changer mechanism. FIG. 8 is an illustration of the tape cassette with the cover open and the internal separating wall 221 which carries the tape hubs, for example the tape hub 222, as well as the deviating elements 227, 228, 229, partially removed after unlocking the locking mechanism 231 which will be explained below. When the tape cassette is closed, the lock 231 engages a slot 232 in the wall of the housing.

The separating wall 221 supports a further tape guide element 302 (FIG. 9) which is capable of rotation and which guides the tape 226 to the wind-up reel 225.

Figure 9:
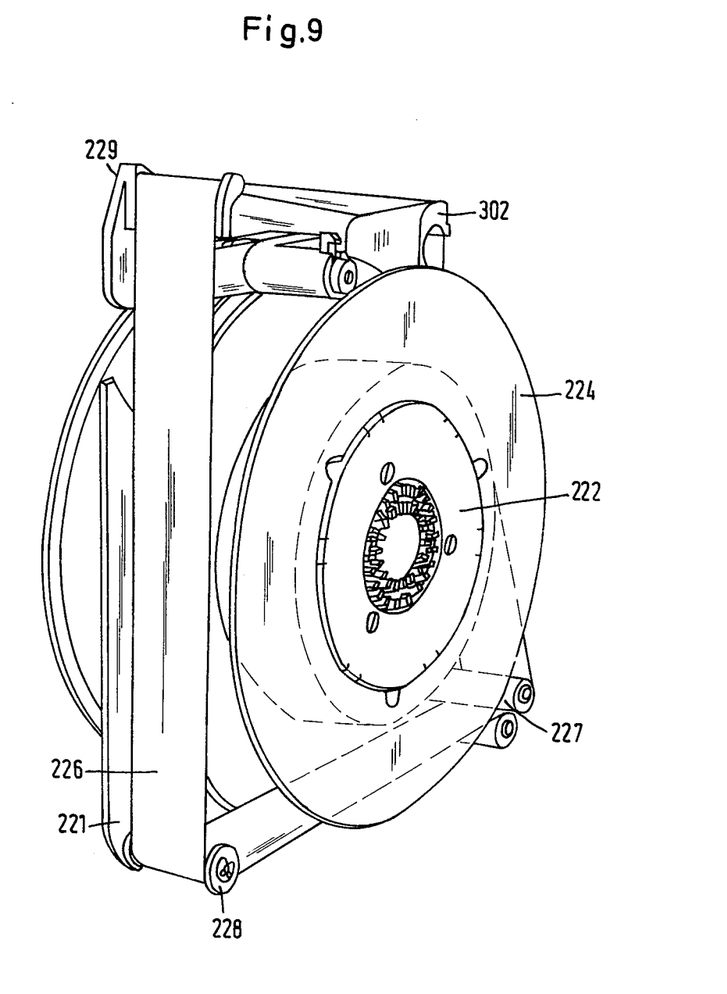
FIG. 9 is a perspective view of the internal parts of the cassette of FIG. 8.

FIG. 9 is a perspective view of the internal parts of the cassette of FIG. 7. It is seen that the separating wall 221 and the elements mounted thereon, i.e., the reel hubs 222, 223 and the reels 224, 225 which they hold as well as all of the tape guide elements, form a single construction unit. The relative location of these parts is unchanged when the separating wall 221 is removed from the housing 210. In particular, the angles formed by the tape 226 with respect to all other elements are maintained during such a removal and unilateral strains and edge stresses prevented.

Figure 10:
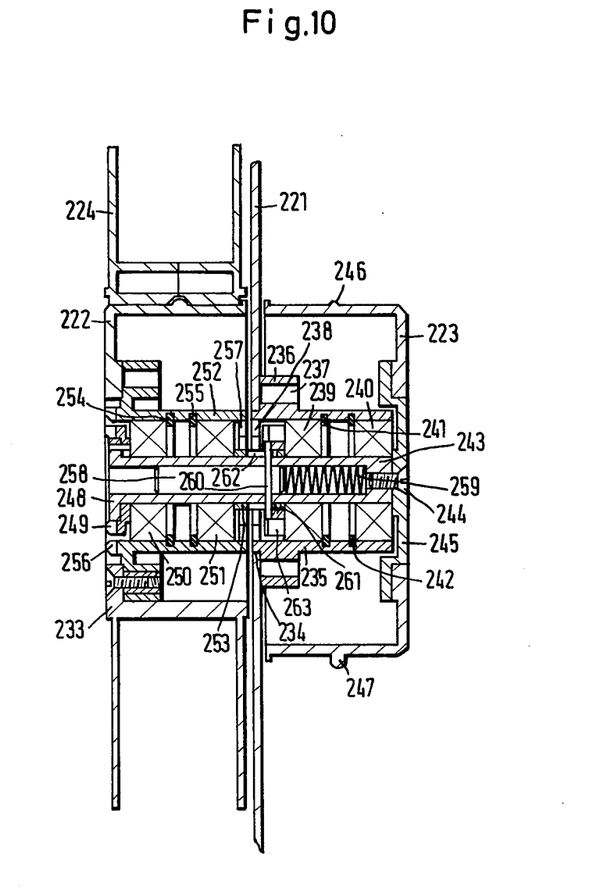
FIG. 10 is a sectional view illustrating the disposition of the tape reel hubs on the separating wall.

FIG. 10 is a sectional view of the tape holding and supporting hubs 222, 223 when the cassette is located outside of the recording and playback mechanism. It should be noted that the reel hub 223 is illustrated in its entirety, whereas the reel hub 222 is shown only partly so as to permit the illustration of two different reels, i.e., a reel 224 which elastically engages the hub 222 while a different reel 233 is attached to the hub by screws. The latter construction permits the use of a reel with a smaller core diameter and thus greater tape capacity.

The manner in which the reel hubs are mounted is as follows.

A bushing 235 is mounted concentrically in an opening 234 of the separating wall 221. It is fastened to the wall 221 by a flange 236 through a number of peripheral holes 237 by screws, rivets, or the like. An internal gear 238 is provided at the ends of the bearing 235 adjacent to the separating wall 221. Two roller bearings 239, 240 are pressed into the bearing 235 and held in place by snap rings 241, 242 which define their mutual position. The internal races of the bearings 239, 240 are pressed on a hollow shaft 243 in such a manner as to be substantially flush with the end of the bushing 235 and the ends of the hollow shaft 243. An end plate 245 is fixedly attached to the hollow shaft 243 by means of a recessed screw 244 and supports the reel hub 223. The outer periphery of the hub 223 is divided into sectors which are urged outwardly elastically and which engage the inside surface of a tape reel mounted thereon. The position of the reel on the hub is secured by pips 246 which engage an annular groove in the tape reel and the hub has cams 247 which insure corotation.

The hollow shaft 243 extends through the opening 234 in the separating wall 221 and has a flange 248, the periphery of which carries a frontal gear 249. Two roller bearings 250, 251 rotatably support a hub 252 on the hollow shaft 243. The bearing 251 is held in position with respect to the bearing 239 by a spacer sleeve 253 and the outer races of the bearings 250 and 251 are axially located by snap rings 254, 255 which engage corresponding grooves in the hub 252. At its end remote from the separating wall 221, the hub 252 has a frontal gear 256 while its end adjacent to the wall 221 has an internal gear 257.

Gliding within the hollow shaft 242 is a pin 258 which is urged into the leftmost position as seen in FIG. 10 by a compression spring 259. A locking cross is coupled to the pin 258 by a radial pin 260. The locking cross 261 glides axially on the spacer sleeve 253, the latter being provided with two diametrically opposite axial slots 262 which permit the passage of the radial pin 260. The diameter and division of the gear teeth 263 are such as to permit engagement with the internal gears 238 and 257.

Figure 11:
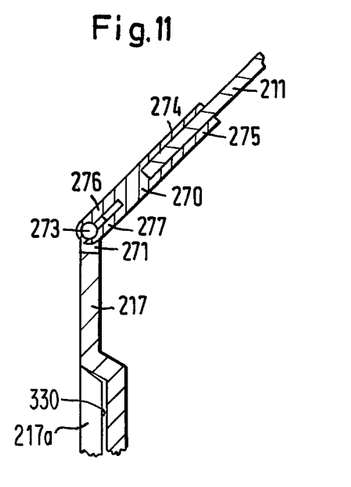
FIG. 11 is a detailed illustration of the hinge of the cassette cover.
Figure 12:
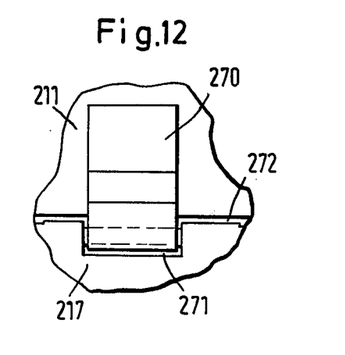
FIG. 12 is a top view of the hinge of FIG. 11.

FIGS. 11 and 12 illustrate in detail the hinge which may be used to attach the cover 211 to a side wall of the shell 217 of the housing 210. As illustrated, the wall 217 has a recess 271 at its upper edge in the vicinity of the hinge 270. A hinge pin 273 joins opposite edges of the recess 271. The hinge 270 has a substantially H-shaped cross section in which two opposite pads 274, 275 engage the edge of the cover 211 and may be joined thereto by any suitable method, for example adhesion, welding, etc. The remaining pads 276, 277 elastically engage the hinge pin 273 and are suitably rounded for this purpose. The attachment of the cover 211 to the housing 210 is performed by snapping the hinge onto the hinge pin 273.

The hinge 270 does not protrude beyond the external contours of the cassette in any position of the cover 211 which aids in the design of the associated cassette receiver of the tape recording and playback apparatus.

Figure 13:
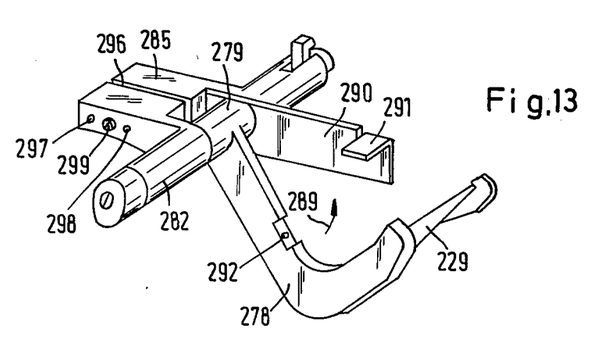
FIG. 13 is a perspective view of the closing and locking mechanism for the cassette of FIG. 7.
Figure 14:
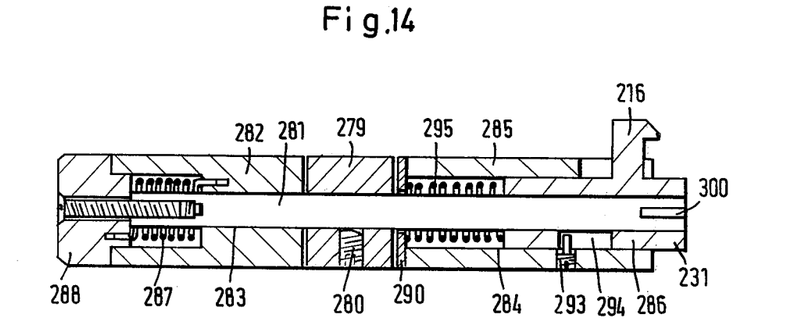
FIG. 14 is an axial sectional view of the combined closing and locking mechanism of FIG. 13.

FIGS. 13 and 14 illustrate the combined closing and locking mechanisms 216, 231. FIG. 13 is a perspective view showing the tape guide element 229 attached at one end of a pivoting lever 278 which is part of a bushing 279 mounted on the shaft 281 and fixedly attached thereto by a lock screw 280 (FIG. 14). The shaft 281 is carried at one end in a bore 283 of a bracket 282 while its other end is carried in a sleeve 286 which is held in a bore 284 of the support block 285. The pin 280 is capable of relative rotation with respect to the sleeve 286.

A torsion spring 287, one end of which is held in the block 282 and the other end of which is held in a cap 288 fixedly attached to the shaft 281, urges the shaft 281 and the bearing 279 as well as the pivotal lever 278 and the tape guide 229 to rotate in the direction of the arrow 289. The rotation is limited by a stop 291 formed on a bracket 290. An adjustment screw 292 permits the exact positioning of the stop member 291 with respect to the tape guide 229.

The sleeve 286 can glide axially in the bore 284 of the bracket 285. The axial motion of the sleeve 286 is limited by a screw 293 which moves in a guide slot 294 of the sleeve 286. A compression spring 295 urges the sleeve 286 and the integral latch 216 into the position illustrated in FIG. 14.

The two blocks 282 and 285 define a gap 296 (FIG. 13) in which the separating wall 221 is placed after assembly. The blocks 282 and 285 are located on the wall 221 by locating pins 297, 298 which are placed in the block 282 and penetrate the wall 221 as well as the block 285 while a screw 299 clamps the two blocks 282, 285 and the wall 221 together.

The end of the shaft 281 has a radial slot 300.

Operation of the tape cassette and associated mechanisms:

The closed cassette is placed in the appropriate receiver of a tape playback apparatus with the shell 218 facing downwardly. An opening mechanism which is part of the tape recording and playback apparatus and which suitably consists of a bushing of somewhat smaller external diameter than that of the sleeve 286 (FIG. 14) has a radial pin near its end that cooperates with the slot 300 in the shaft 281 and which engages the end face thereof, moving it axially in the direction of the stop bracket 290 against the force of the spring 295. This displacement causes the latch 216 to release the lock member 215 on the cover 211 and permits the opening of the cover. At the same time, the lock mechanism 231 is moved out of the slot 232 (FIG. 8) in the wall 218 and thus releases the separating wall 221 which carries the tape reels and tape guide elements. The slot 300 of the shaft 281 is engaged by the radial pin of the cassette opening mechanism which is a part of the tape playback and recording apparatus. This mechanism moves parallel with respect to the plane of the separating wall 221 through a predetermined distance, thereby also pulling the wall 221 and the elements mounted thereon out of the cassette housing 210, while the cover 211 is being opened. When the correct position is reached, the frontal end face gears 249 and 256 and concentric with an opening 301 in the housing wall 218 as best seen in FIG. 8. When the cassette is then lowered within the playback apparatus, the reel drive members of the apparatus engage the frontal gears 249 and 256, thereby providing rotation of the tape reels.

The cassette unlocking mechanism which is part of the tape playback apparatus also permits rotation of the shaft 281 (FIG. 14) by engagement of the slot 300 and against the force of the torsional spring 287, thereby pivoting the tape guide 229 out of the operational tape path. This removal of the tape guide of the cassette may be required for example in a tape recording and playback apparatus such as described in the co-pending application which corresponds to the Published German Patent Application DE-OS 28 07 272 of the Applicant.

After the cassette is lowered into the operational position on the tape recorder, the drive shafts of the tape recorder engage the frontal gears 249 and 256 with cooperating frontal gears of corresponding diameter. At the same time, a central pin belonging to the tape recorder, and not shown, pushes the pin 258 of the cassette against the force of the spring 259, thereby causing the cross pin 260 to pass through the spacer sleeve 253 which causes the locking cross 261 to disengage the peripheral gear 263 from the internal gears 238 and 257 within the bearing 235 and the hub 252, respectively. Accordingly, the reel hubs 222 and 223 are freely rotatable by rotational forces imparted to the gears 249 and 256, respectively.

When the tape cassette 210 is lifted from the tape recorder, the spring 259 is able to push the pin 258 as far as is permitted by the motion of the radial pin 260 in the slot 262 of the spacer sleeve so that the external teeth 263 of the locking cross 261 engage the internal gears 238 and 257. Thus, the relative rotation of the two reel hubs 222, 223 is prevented as is their relative rotation with respect to the cassette housing. In this condition, any shocks or drastic rotary motions of the cassette housing, for example during the transport thereof, will not cause slackening of the tape or uncontrollable stresses.

Portions of the outer cassette surface may be recessed, see FIG. 11, at 217a, so as to permit attachment therein of identifying labels 330 (FIG. 17), etc. by adhesion or other means. These labels 330 can carry machine-readable codes 331, etc.

Figures 15, 17:
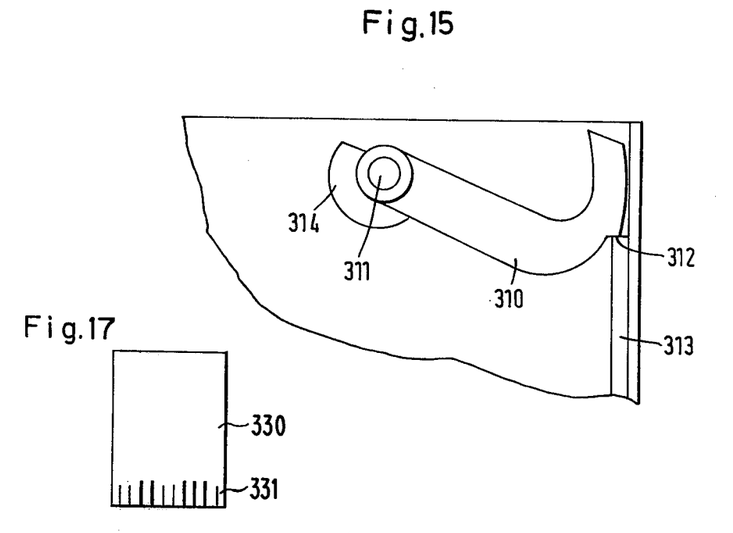
FIG. 15 illustrates a variant of the pivotal tape guide lever of the mechanism of FIG. 13.
FIG. 17 is a front view of an identification label with a machine-readable code thereon.

A variant of the pivotal lever 278 of FIG. 13 is illustrated in FIG. 15. The lever 310 pivots about a shaft 311 in the same manner as previously described with respect to FIGS. 13 and 14 on a separating wall 221. A shoulder 312 of the lever 310 rests on a guide rib 313 within the cassette wall, along the central seam 219. The attachment of the shoulder 312 to the rib 313 prevents undesired clockwise rotation of the lever before the locking mechanism belonging to the tape recorder and playback apparatus has a chance to engage the slot 300. The vertical location of the cassette is defined during operation by a semicircular segment 314 which engages a slot in the tape recorder.

Figure 16:
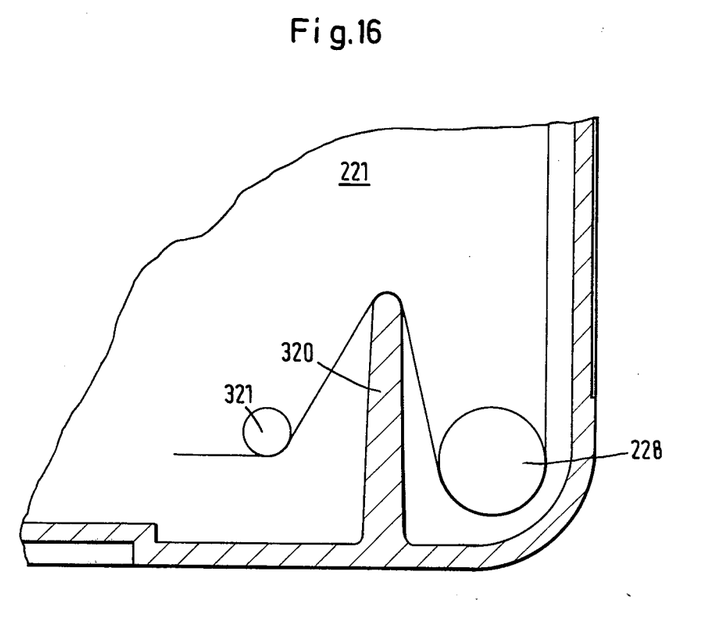
FIG. 16 is a highly enlarged detailed view of a tape tensioning mechanism within the cassette.

The inside of the bottom of the cassette carries a tape tensioner 320 whose length is so chosen that any loose tape which is present after the cassette has been removed from the tape recorder is folded between a deviating pin 321 and the roller 228 when the separating wall 221 is pushed back into the cassette housing 10. The tape deviating pin 321 may also serve as a stop which limits the travel of a stop pin mounted on the separating wall 221 which defines the operating position of the separating wall with respect to the tape recorder and playback apparatus.

Various changes and modifications may be made and features described in connection with one of the embodiments may be used in the other, all within the scope of the inventive concept.

We claim:

1. A tape cassette comprising
   a housing (10, 210) of substantially parallelepiped shape having two narrow sides;
   a separating wall (12, 221) disposed movably within said housing, said separating wall dividing said housing into two internal chambers;
   support means for holding a tape reel rotatably on each of the opposite sides of said separating walls;
   a movable cover (211) positioned on the housing at a narrow side thereof to selectively provide access to the interior of the housing;
   locking means (231) securing and locking said separating wall (221) in position within said housing;
   and a locking mechanism (215, 216) locking the cover (211) in closed position in the housing,
   said locking mechanism being conjointly operable with said locking means for said separating wall to permit conjoint opening of the cover and unlocking said separating wall for movement with respect to said housing.

2. A tape cassette according to claim 1, wherein said support means includes tape reel hubs (13, 14; 221, 223) one of said support hubs being mounted on each of the opposite surfaces of said separating wall and serving to rotatably support a tape reel.

3. A tape cassette according to claim 2, further comprising tape guide means (18, 19; 227, 228, 229, 232) which are supported entirely by said separating wall.

4. A tape cassette according to claim 1, wherein said housing one of the narrow ends of said parallelpiped has an opening through which said separating wall may be removed therefrom.

5. A tape cassette according to claim 1, wherein said housing has two opposite narrow sides;
   the cover (211) closing off one side;
   and a removable panel (44) is provided, conjointly movable with the separating wall (12,221) closing off the other side, whereby opposite narrow sides can be opened for the purpose of removing said separating wall and the tape support means therefrom.

6. A tape cassette according to claim 1, wherein said locking mechanism (231) and said closure mechanism (216) can both be operated by an actuating member external to said cassette and belonging to a cassette player apparatus.

7. A tape cassette according to claim 1, wherein one wall (218) of said cassette housing (210) has an opening (232) which engages a locking sleeve (286) belonging to said locking mechanism (231) and wherein said locking sleeve (286) carries a closure latch (216).

8. A tape cassette according to claim 1, further comprising tape guide members (18, 19) so disposed within said housing (10) as to define therewithin a tape path which is inclined with respect to the plane of said cassette housing (10).

9. A tape cassette according to claim 8, wherein said tape guide elements (18, 19) are disposed on pivotable mounts.

10. A tape cassette according to claim 1, further comprising a pivotable tape guide element (229) whose pivotable axis coincides with the axis of said locking mechanism (231).

11. A tape cassette according to claim 10, further comprising a coupling member (300) for permitting the pivoting of said tape guide element (229) by means of an actuating member external of said tape cassette.

12. A tape cassette according to claim 8, wherein said tape guide elements have openings permitting the passage of still further tape guide elements therethrough.

13. A tape cassette according to claim 1, wherein said support means for holding tape reels include tape reel hubs (13, 14), one of said hubs being rotatably mounted on each of the opposite surfaces of said separating wall, and including drive means which are engageable from outside of said housing (10, 210) for the purpose of rotating said tape hubs (13, 14).

14. A tape cassette according to claim 13, wherein said drive means for rotating said tape hubs (13, 14) are end face frontal gear teeth (67, 69).

15. A tape cassette according to claim 14, further comprising a drive ring (64) attached to one tape hub (13) in rotation-sharing manner, the end face of said drive ring (64) being provided with end face gear teeth (67).

16. A tape cassette according to claim 14, wherein the drive means includes a drive tube (66) passing perpendicularly through an opening (52) in said separating wall (12) and the end face of said drive tube (66) being provided with said end face frontal gear teeth (69), said gear teeth (69) being concentric within the gear teeth (67) on the drive ring.

17. A tape cassette according to claim 1, further comprising tape length equalizer means (100) disposed within said housing (10, 210).

18. A tape cassette according to claim 17, wherein said tape length equalizer mechanism (100) includes roller means so disposed as to define an S-shaped loop in the magnetic tape (17).

19. A tape cassette according to claim 17, wherein said tape length equalizing device (100) includes at least two tape guide rollers (101, 102) disposed at diametrically opposite points of a shaft (103).

20. A tape cassette according to claim 19, wherein said tape guide rollers (101, 102) are disposed rotatably on a rotatable disc (104), said disc (104) being urged to rotate in one direction by spring means; whereby a torque is applied to said disc which opposes the torque imparted to said disc by the tape (17) guided by said rollers (101, 102).

21. A tape cassette according to claim 1, wherein said housing (10) includes stiffening and guide ribs (20) within said housing (10).

22. A tape cassette according to claim 21, wherein said guide ribs (220) are disposed coaxially on opposite halves of said housing (210), thereby defining a guide slot for guiding the displacements of said separating wall (221).

23. A tape cassette according to claim 1, wherein the long narrow sides of said parallelepiped define within said housing (10) a guide groove for guiding the displacements of said separating wall.

24. A tape cassette according to claim 1, further comprising external surface depressions in said housing (10, 210) for receiving identification means.

25. A tape cassette according to claim 24, wherein at least one of said identification means carries a machine-readable code.

26. A tape cassette comprising
a housing (10, 210) of substantially parallelepiped shape;
a separating wall (12, 221) disposed movably within said housing, said separating wall dividing said housing into two internal chambers;
support means for holding a tape reel rotatable in each of the opposite surfaces of said separating walls,
wherein said support means comprise
stationary bearing bushings (53, 54) to support a tape hub (13, 14) on either of the two sides of said separating wall (12, 221), said bearing bushings having internal gear teeth (73, 74) disposed concentrically with respect to an opening (52) in said separating wall.

27. A tape cassette according to claim 26, further comprising a locking sleeve (70) disposed on said drive tube (66) with axial play but locked in rotation therewith.

28. A tape cassette according to claim 27, wherein said locking sleeve is provided with external gear teeth (72) which can cooperate with said internal gear teeth (73, 74) on said bearing bushings (53, 54) and wherein said locking sleeve (70) is further provided with frontal end face gears (71) which can cooperate with second frontal gears (68) disposed at the second end face of said drive ring (64).

29. A tape cassette according to claim 28, wherein said tape hubs (13, 14) have elastic circumferential sections (81).

30. A tape cassette according to claim 29, wherein in each of said sections (81) supports a radially extending protrusion (83) approximately at the point of the maximum radial extent of said section.

31. Tape cassette according to claim 26, further comprising drive means engageable from the outside of said housing with said tape hub (13, 14) to rotate said tape hubs.

32. Tape cassette according to claim 31, wherein said drive means for rotating said tape hubs (13, 14) comprise end face, frontal gear teeth (67, 69).

33. Tape cassette according to claim 32, further comprising a drive ring (64) attached to one tape hub (13) in rotation-transmitting manner, and an end face gearing (67) on an end face of said drive ring.

34. Tape cassette according to claim 33, wherein the drive means includes a drive tube (66) passing perpendicularly through an opening in said separating wall, an end face of said drive tube being provided with said end face, frontal gear teeth (69);
said gear teeth (69) being concentric within the gear teeth (67) on the drive ring.

35. A tape cassette comprising
a housing (10, 210) of substantially parallelepiped shape;
a separating wall (12, 221) disposed movably within said housing, said separating wall dividing said housing into two internal chambers;
support means for holding a tape reel rotatably on each of the opposite surfaces of said separating wall;
at least one slot (21) formed in a side wall of the housing and extending in the direction of movement of the separating wall within said housing;
and a pin (22) attached to said separating wall, and engaged in said slot to limit the displacement of said separating wall within said housing.

36. A tape cassette according to claim 35, wherein two pins (22) are provided, attached to elastic levers (42) for elastic displacement out of said slots (21).

37. A tape cassette according to claim 36, wherein said levers (42) may be moved by slides (110) located in one wall (44) of said cassette housing (10), and there being provided coupler means (43, 114) for transmitting the motion of said slide (110) to said levers (42).

38. A tape cassette comprising
a housing (10, 210) of substantially parallelepiped shape having two narrow sides;
a separating wall (12, 221) disposed movably within said housing, said separating wall dividing said housing into two internal chambers;
support means for holding a tape reel rotatably on each of the opposite surfaces of said separating wall;
a movable, substantially plane cover (11, 211) closing one of the narrow sides of said housing;
and at least one hinge (210) securing said cover to said housing.

39. A tape cassette according to claim 38, wherein the pivotal axis of said hinge lies in the plane of said cover (211) and also in the plane of a side wall (217) of said housing (210).

40. A tape cassette according to claim 38 wherein the housing wall (217) is formed with a recess (271);

and said hinge includes a hinge pin (273) located in the recess (271).

41. A tape cassette according to claim 23, wherein said hinge includes a hinge body (270) having two elastic pads (276, 277) which are attached to said cover (211) and which elastically surround said hinge pin (273).

42. A tape cassette according to claim 38, wherein a wall (44) of said housing (10) which lies opposite said cover (11) is rigidly attached to said separating wall (12).

* * * * *